(12) United States Patent
Liu et al.

(10) Patent No.: US 12,470,281 B2
(45) Date of Patent: Nov. 11, 2025

(54) DEFAULT BEAM DETERMINATION FOR UPLINK SIGNAL TRANSMISSION

(71) Applicant: Lenovo (Beijing) Ltd., Beijing (CN)

(72) Inventors: Bingchao Liu, Changping District (CN); Chenxi Zhu, Haidian District (CN); Wei Ling, Beijing (CN); Lingling Xiao, Beijing (CN); Yi Zhang, Chao Yang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 461 days.

(21) Appl. No.: 18/003,189

(22) PCT Filed: Jun. 23, 2020

(86) PCT No.: PCT/CN2020/097626
§ 371 (c)(1),
(2) Date: Dec. 23, 2022

(87) PCT Pub. No.: WO2021/258279
PCT Pub. Date: Dec. 30, 2021

(65) Prior Publication Data
US 2023/0261719 A1    Aug. 17, 2023

(51) Int. Cl.
*H04B 7/06* (2006.01)
*H04L 5/00* (2006.01)

(52) U.S. Cl.
CPC ....... *H04B 7/06968* (2023.05); *H04L 5/0051* (2013.01); *H04L 5/0053* (2013.01)

(58) Field of Classification Search
CPC ... H04B 7/0695; H04L 5/0051; H04L 5/0053; H04L 5/0023; H04W 52/242
See application file for complete search history.

(56) References Cited

U.S. PATENT DOCUMENTS

| | | | |
|---|---|---|---|
| 2020/0389852 A1* | 12/2020 | Wang | H04W 72/046 |
| 2021/0105805 A1* | 4/2021 | Venugopal | H04W 72/046 |
| 2022/0279460 A1* | 9/2022 | Zhang | H04W 16/28 |

FOREIGN PATENT DOCUMENTS

| | | |
|---|---|---|
| CN | 110120862 A | 8/2019 |
| CN | 110475334 A | 11/2019 |
| CN | 110536394 A | 12/2019 |

OTHER PUBLICATIONS

PCT/CN2020/097626, "International Preliminary Report on Patentability", PCT Application No. PCT/CN2020/097626, Jan. 5, 2023, 5 pages.

(Continued)

*Primary Examiner* — Kiet Tang
(74) *Attorney, Agent, or Firm* — FIG. 1 Patents (57) ABSTRACT

Methods and apparatuses for determining default spatial relation and default PL-RS are disclosed. A method comprises determining a default spatial relation and a default pathloss reference RS (PL-RS) for transmission of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and transmitting the uplink resource according to the determined default spatial relation and the power determined by the determined default PL-RS.

20 Claims, 3 Drawing Sheets

(56) References Cited

OTHER PUBLICATIONS

PCT/CN2020/097626 , "International Search Report and Written Opinion", PCT Application No. PCT/CN2020/097626, Mar. 22, 2021, 6 pages.
Vivo , "Discussion on remaining issues on multi beam operation", 3GPP TSG RAN WG1 #100bis, R1-2001679, e-Meeting [retrieved Jan. 26, 2023]. Retrieved from the Internet <https://www.3gpp.org/ftp/TSG_RAN/WG1_RL1/TSGR1_100b_e/Docs/>., Apr. 2020, 12 Pages.

\* cited by examiner

DEFAULT BEAM DETERMINATION FOR UPLINK SIGNAL TRANSMISSION

FIELD

The subject matter disclosed herein generally relates to wireless communications, and more particularly relates to methods and apparatuses for determining default spatial relation and default pathloss reference RS for transmission of uplink signals, especially in condition of multiple TRPs.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED). Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Downlink control information (DCI), transmission reception point (TRP), multiple TRP (multi-TRP or M-TRP), Quasi Co-Location (QCL), channel state information reference signal (CSI-RS), Transmission Configuration Indication (TCI), reference signal (RS), component carrier (CC), band width part (BWP), Media Access Control (MAC), Control Element (CE), Demodulation Reference Signal (DM-RS), non-coherent joint transmission (NCJT), sounding reference signal (SRS), frequency range (FR), pathloss reference RS (PL-RS), control resource set (CORESET).

The default spatial relation for uplink resource (e.g. SRS resource or dedicated-PUCCH resource (which refers to the PUCCH resources configured for a UE in RRC-connected mode) or PUSCH resource scheduled by DCI format 0_0) in RRC-connected mode is an important feature in 3GPP NR Release 16 for the UL signal transmission without configured spatial relation. However, the UE behavior is only specified for the single-TRP scenarios. Multiple TRPs and/or Panels based PDSCH transmission has been specified in 3GPP NR Release 16. The PDSCH TC state indication and activation have been enhanced to support single-DCI based multi-TRP based PDSCH transmission as well as multi-DCI based multi-TRP based PDSCH transmission. The UE may determine the default spatial relation by the activated TCI state with the lowest ID applicable to PDSCH in the active DL-BWP of a CC when no CORESET is configured on the CC on which the triggered resources are transmitted. However, this scheme cannot apply to the multi-TRP scenario, because multiple TCI states can be indicated by this scheme, which would confuse a UE with the capability of transmitting UL signals with only single beam at a time instance.

This invention discloses methods and apparatuses for determining default spatial relation for transmission of uplink signal without configured spatial relation in multi-TRP scenario, especially in FR2.

BRIEF SUMMARY

Methods and apparatuses for determining default spatial relation and default PL-RS are disclosed.

In one embodiment, a method comprises determining a default spatial relation and a default pathloss reference RS (PL-RS) for transmission of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and transmitting the uplink resource according to the determined default spatial relation and the power determined by the determined default PL-RS.

In one embodiment, the uplink resource is SRS resource, the higher layer parameters related to spatial relation is spatialRelationInfo, the higher layer parameter related to pathloss reference signal is pathlossReferenceRS, and the higher layer parameter related to enable default beam is enableDefaultBeamPlForSRS. Alternatively, the uplink resource is dedicated PUCCH transmission, the higher layer parameters related to spatial relation is PUCCH-spatialRelationInfo, the higher layer parameter related to pathloss reference signal is pathlossReferenceRS, and the higher layer parameter related to enable default beam is enableDefaultBeamPlForPUCCH.

In another embodiment, if at least one TCI field codepoint for PDSCH transmission on the serving cell points to two different TCI states, the default spatial relation is determined with reference to the RS with 'QCL-Type-D' corresponding to a default TCI state which is determined as a first TCI state pointed to by the lowest TCI codepoint among the TCI field codepoints containing two different TCI states. Alternatively, the default TCI state which is determined as a first TCI state pointed to by the lowest TCI codepoint among all the TCI field codepoints. In still another embodiment, the serving cell is a SCell without configured CORESET, each of the activated TCI states for PDSCH on the SCell is associated with a CORESETPoolIndex value configured on a PCell, the spatial relation is determined with reference to the RS with 'QCL-Type-D' corresponding to a default TCI state which is determined as the activated TCI state with the lowest ID applicable to PDSCH associated with the same CORESETPoolIndex value as that associated with the uplink resource in the active DL-BWP. In some embodiment, determining the default PL-RS comprises determining a RS resource index q providing a periodic RS resource with 'QCL-TypeD' in the determined default TCI state.

In another embodiment, a remote unit comprises a processor that determines a default spatial relation and a default pathloss reference RS (PL-RS) for transmission of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and a transmitter that transmits the uplink resource according to the determined default spatial relation and the power determined by the determined default PL-RS.

In one embodiment, a method comprises determining a default spatial relation and a default pathloss reference RS (PL-RS) for reception of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and receiving the uplink resource according to the determined default spatial relation and the power determined by the determined default PL-RS.

In yet another embodiment, a base unit comprises a processor that determines a default spatial relation and a default pathloss reference RS (PL-RS) for reception of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and a transmitter that transmits the uplink resource according to the determined default spatial relation and the power determined by the determined default PL-RS.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby. Java. Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment". "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

A first embodiment relates to determining default TCI state for transmission of uplink signal in single-DCI based multi-TRP scenario.

Single-DCI based multi-TRP PDSCH transmission is used for the scenario that two TRPs serve one UE with ideal backhaul. In any slot, any one (TRP0 or TRP1) of the two TRPs (e.g. TRP0 and TRP1) may transmit a DCI scheduling a PDSCH transmission transmitted from two TRPs (e.g. TRP0 and TRP1) where partial layers of the PDSCH transmission are transmitted by one TRP (e.g. TRP0) and other layers of the PDSCH transmission are transmitted by the other TRP (e.g. TRP1). It means that a UE may receive a PDSCH transmission transmitted from two TRPs by using two different TCI states indicated by the 'Transmission Configuration Indication' field in the triggering DCI. So, the TCI field in the TCI may point to two different TCI states.

In the first embodiment, an uplink resource (e.g. aperiodic SRS resource or dedicated PUCCH resource) may be triggered by a DCI carried by a PDCCH transmitted on one CC. The uplink resource will be transmitted on the one CC.

The spatial relation, which is configured by higher layer parameter spatialRelationInfo, for uplink resource determines the spatial domain transmission filter for the target uplink signal. If the spatial relation is indicated by a ID of a reference 'ssb-Index', the UE shall transmit the target uplink resource with the same spatial domain transmission filter used for the reception of the reference SS/PBCH block. If the spatial relation is indicated by a ID of a reference 'csi-RS-Index', the UE shall transmit the target uplink resource with the same spatial domain transmission filter used for the reception of the reference CSI-RS. If the spatial relation is indicated by a ID of a reference 'srs', the UE shall transmit the target uplink resource with the same spatial domain transmission filter used for the transmission of the reference SRS. The pathloss reference RS (PL-RS), which is configured by higher layer parameter pathlossReferenceRS, is used to indicate a DL RS to estimate the DL pathloss to determine the transmit power for the uplink resource according to uplink power control procedure. The spatial relation and the PL-RS may or may not configured for the target uplink signal.

In the first embodiment, the spatial relation and PL-RS are not configured for the triggered uplink resource (e.g., aperiodic SRS resource or dedicated PUCCH resource). On the other hand, the default beam is enabled for the triggered uplink resource by setting a predetermined higher layer parameter to 'enable', which means that a default spatial relation and a default PL-RS are determined for the triggered uplink resource. In particular, for aperiodic SRS resource, neither spatialRelationInfo nor pathlossReferenceRS is configured for the triggered SRS resource but a higher layer parameter enableDefaultBeamPlForSRS is set as 'enable'. For dedicated PUCCH resource, neither PUCCH-spatialRelationInfo nor pathlossReferenceRS is configured or activated for the target PUCCH resource but a higher layer parameter enableDefaultBeamPlForPUCCH is set as 'enable'.

In NR, a control resource set (CORESET) is introduced in view of the fact that the bandwidth of a carrier can be very large in NR. The bandwidth of a CORESET can be smaller than the bandwidth of a carrier. A CORESET is used to configure a set of time-frequency resources for transmission of PDCCH. For a give serving secondary cell, CORESET may or may not be configured. According to the first embodiment, no CORESET is configured for the one CC on which the triggered uplink resources are transmitted.

A TCI-state activation MAC CE containing activated PDSCH TCI states is received for the PDSCH transmission on the current active BWP of a serving cell (i.e. the one CC) without configured CORESET. The TCI-state activation MAC CE contains several (e.g. 8) codepoints each of which points to one or two TCI states. At least one codepoint points to two TCI states.

A detailed explanation of the TCI states contained in the TCI-state activation MAC CE is given as follows.

The UE can be configured with a list of up to M TCI state configurations to decode PDSCH according to a detected PDCCH with DCI intended for the UE and the given serving cell, where M depends on the UE capability. The TCI state is configured by the following RRC signaling:

TCI state

The IE TCI state associates one or two DL reference signals with a corresponding quasi-colocation (QCL) type.

| TCI state information element |
|---|

-- ASN1START

-- TAG-TCI STATE-START

| | | |
|---|---|---|
| TCI state ::= | SEQUENCE { | |
|   TCI stateId | TCI state ID, | |
|   qcl-Type1 | QCL-Info, | |
|   qcl-Type2 | QCL-Info | OPTIONAL, -- Need R |
|   .. | | |
| } | | |
| QCL-Info ::= | SEQUENCE { | |
|   cell | ServCellIndex | OPTIONAL, -- Need R |
|   bwp-Id | BWP-ID | OPTIONAL, -- Cond CSI-RS-Indicated |
|   referenceSignal | CHOICE { | |
|     csi-rs | NZP-CSI-RS-ResourceId, | |
|     ssb | SSB-Index | |
|   }, | | |
|   qcl-Type | ENUMERATED {typeA, typeB, typeC, typeD}, | |
|   ... | | |
| } | | |

-- TAG-TCI STATE-STOP

-- ASN1STOP

Each TCI state contains parameters for configuring a quasi co-location (QCL) relationship between one or two downlink reference signals (i.e. RS(s)) and the DM-RS ports of the PDSCH, the DM-RS port of PDCCH or the CSI-RS port(s) of a CSI-RS resource. The quasi co-location relationship is configured by the higher layer parameter qcl-Type1 for the first downlink RS, and qcl-Type2 for the second downlink RS (if configured). For the case of two downlink RSs, the QCL types shall not be the same, regardless of whether the references are to the same downlink RS or different downlink RSs. The quasi co-location types (i.e. QCL parameter(s)) corresponding to each downlink RS are given by the higher layer parameter qcl-Type in QCL-Info and may take one of the following values:

'QCL-TypeA': {Doppler shift. Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a TCI state is configured as TCI state={CSI-RS #1, QCL-TypeA; CSI-RS #2, QCL-TypeD} and it is indicated for a PDSCH reception, it means that the UE may assume that the Doppler shift, Doppler spread, average delay, delay spread for the DM-RS ports of the PDSCH are the same as those estimated by CSI-RS #1 and the UE may receive the PDSCH and the corresponding DM-RS port using the same spatial RX parameter as that used to receive CSI-RS #2.

One TCI state contains one or two RSs each of which is associated with a QCL type. The RS associated with QCL-TypeD contained in a TCI state used for reception of the PDSCH can be used as a reference signal for transmission of the triggered uplink resource (aperiodic SRS resource or dedicated PUCCH resource) without configured spatial relation and PL-RS. It can be said that the QCL-TypeD RS corresponding to a TCI state is used to determine the default spatial relation and the default PL-RS. As in single-DCI based multi-TRP scenario, the PDSCH may be transmitted from two TRPs, there might be two TCI states for reception of the PDSCH. Therefore, it is necessary to determine one TCI state, from the TCI states for reception of the PDSCH, as a reference to determine the default spatial relation and the default PL-RS of the triggered uplink resource without configured spatial relation and PL-RS.

According to the first embodiment, the default spatial relation and the default PL-RS of the uplink resource (e.g. aperiodic SRS resource or dedicated PUCCH resource) can be determined by one of the TCI states pointed to by one codepoint contained in the TCI-state activation MAC CE. Especially, the default spatial relation and the default PL-RS to be used is the QCL-TypeD RS corresponding to the determined TC state. In addition, a RS resource index $q_d$ providing a periodic RS resource with 'QCL-TypeD' in the determined TCI state is determined as the pathloss reference RS for the uplink resource.

According to a first sub-embodiment, a first TCI state of the two different TCI states pointed to by the lowest codepoint among the codepoints pointing to two different TCI states is determined as the default TCI state, and the default spatial relation and the default PL-RS to be used are determined according to the QCL-TypeD RS corresponding to the determined default TCI state.

According to a second sub-embodiment, a first TCI state pointed to by the lowest codepoint (e.g., codepoint '000') among all codepoints pointing to either one or two TCI states is determined as the default TCI state, and the default spatial relation and the default PL-RS to be used are determined according to the QCL-TypeD RS corresponding the determined default TCI state. In particular, if the lowest codepoint points to one TCI state (i.e. a first TCI state), said one TCI state pointed to by the lowest codepoint is the determined default TCI state. On the other hand, if the lowest codepoint points to two TCI states, a first TCI state of the two TCI states pointed to by the lowest codepoint is the determined default TCI state.

An example of the first embodiment is given as follows. Suppose the following PDSCH TCI state activation MAC CE is received for the current active BWP of the serving cell with no configured CORESET.

---

{
   TCI field with value of '000' codepoint points to TCI state#0,
   TCI field with value of '001' codepoint points to TCI state#2,
   TCI field with value of '010' codepoint points to TCI state#5 and TCI state#8,
   TCI field with value of '011' codepoint points to TCI state#11,
   TCI field with value of '100' codepoint points to TCI state#38,
   TCI field with value of '101' codepoint points to TCI state#52,
   TCI field with value of '110' codepoint points to TCI state#65 and TCI state#88,
   TCI field with value of '111' codepoint points to TCI state#110
}

---

For an aperiodic SRS resource without configured spatialRelationInfo or pathlossReferenceRS but enableDefaultBeamPlForSRS is set as 'enable'. TCI state #5, i.e. a first TCI state of the two TCI states pointed to by the lowest codepoint ('010') among the TCI codepoints pointing to two different TCI states is the determined default TCI state for the aperiodic SRS resource according to the first sub-embodiment. In addition, a RS resource index $q_d$ providing a periodic RS resource with 'QCL-TypeD' in TCI state #5 is determined as the pathloss reference RS for the aperiodic SRS resource. According to the second sub-embodiment, TCI state #0, i.e. a first TCI state (in this example, the only one TCI state) pointed to by the lowest codepoint ('000') among all the TCI codepoints is the determined default TCI state for the aperiodic SRS resource. Similarly, according to the second sub-embodiment, a RS resource index q providing a periodic RS resource with 'QCL-TypeD' in TCI state #0 is determined as the pathloss reference RS for the aperiodic SRS resource.

For a dedicated PUCCH resource without configured PUCCH-spatialRelationInfo or pathlossReferenceRS but enableDefaultBeamPlForPUCCH is set as 'enable'. TCI state #5, i.e. a first TCI state of the two TCI states pointed to by the lowest codepoint ('010') among the TCI codepoints pointing to two different TCI states is the determined default TCI state for the dedicated PUCCH resource according to the first sub-embodiment. In addition, a RS resource index $q_d$ providing a periodic RS resource with 'QCL-TypeD' in TCI state #5 is determined as the pathloss reference RS for the dedicated PUCCH resource. According to the second sub-embodiment, TCI state #0, i.e. a first TCI state (in this example, the only one TCI state) pointed to by the lowest codepoint ('000') among all the TCI codepoints is the determined TCI state for the dedicated PUCCH resource. Similarly, according to the second sub-embodiment, a RS resource index $q_d$ providing a periodic RS resource with 'QCL-TypeD' in TCI state #0 is determined as the pathloss reference RS for the dedicated PUCCH resource.

The first embodiment is described with reference to the aperiodic SRS resource or the dedicated PUCCH resource triggered by a DCI. The first embodiment also applies to other uplink resources not triggered by a DCI (e.g. configured periodic SRS resource, semi-persistent (SP) SRS resource activated by a SP SRS Activation/Deactivation MAC CE, or PUCCH resource not triggered by a DCI). That is to say, for the periodic SRS resource or semi-persistent SRS resource without configured spatialRelationInfo or pathlossReferenceRS but enableDefaultBeanPlForSRS set as 'enable' and for the PUCCH resource not triggered by a DCI without configured PUCCH-spatialRelationInfo or pathlossReferenceRS but enableDefaultBeamPlForPUCCH set as 'enable', a first TCI state pointed to by the lowest codepoint among the codepoints pointing to two different TCI states (according the first sub-embodiment) or among all the codepoints (according to the second sub-embodiment) is determined as the default TCI state, and the default spatial relation and the default PL-RS to be used are determined according to the QCL-TypeD RS corresponding to the determined default TCI state.

A second embodiment relates to determining default TCI states in multi-DCI based multi-TRP scenario.

Multi-DCI based multi-TRP PDSCH transmission can be used for the scenario that two TRPs (e.g. TRP0 and TRP1) serve one UE with non-ideal backhaul. In any slot, any TRP (TRP0 or TRP1) may transmit a DCI scheduling a PDSCH transmission transmitted by any one TRP (TRP0 or TRP1). The TCI field in the DCI points to a single TCI state for the PDSCH reception scheduled by the DCI. It means that in one slot, the UE may receive two DCIs transmitted by two TRPs and may receive two PDSCH transmissions simultaneously, each of which is transmitted by a separate TRP. A higher layer parameter CORESETPoolIndex can be configured for each CORESET for TRP identification.

A PCell (e.g. CC #1) can be configured with multi-DCI based multi-TRP transmission for a UE. A SCell (e.g. CC #2) can be configured for cross-carrier PDSCH scheduling for the UE. It means that the PCell (e.g. CC #1) can schedule multi-DCI based multi-TRP PDSCH transmission on this SCell (e.g. CC #2). The PCell, which is configured with multiple TRPs (e.g. TRP0 and TRP1), is configured with one or more CORESETs each of which is associated with a CORESETPoolindex value. For example, some CORESETs in the PCell are associated with CORESETPoolindex=0 (i.e. associated with TRP0) while other CORESETs in the PCell are associated with CORESETPoolindex=1 (i.e. associated with TRP1). The SCell, which can also be configured with multiple TRPs (e.g. TRP0 and TRP1), is not configured with any CORESET.

In multi-DCI based multiple-TRP scenario, a UE may receive a DCI from a CORESET configured with a CORESETPoolindex value on PCell (e.g. CC #1) triggering a transmission of an uplink resource on SCell (e.g. CC #2). The spatial relation and the PL-RS may or may not be configured for the transmission of the triggered uplink resource.

In the second embodiment, the spatial relation and PL-RS are not configured for the triggered uplink resource (e.g., aperiodic SRS resource or dedicated PUCCH resource). On the other hand, the default beam is enabled for the triggered uplink resource by setting a predetermined higher layer parameter to 'enable', which means that a default spatial relation and a default PL-RS are determined for the triggered uplink resource. In particular, for aperiodic SRS resource, neither spatialRelationInfo nor pathlossReferenceRS is configured for the triggered SRS resource but a higher layer parameter enableDefaultBeanPlForSRS is set as 'enable'. For dedicated PUCCH resource, neither PUCCH-spatialRelationInfo nor pathlossReferenceRS is configured or activated for the target PUCCH resource but a higher layer parameter enableDefaultBeamPlForPUCCH is set as 'enable'.

The RS associated with QCL-TypeD contained in a TCI state used for reception of the PDSCH can be used as a reference signal for transmission of the triggered uplink resource (aperiodic SRS resource or dedicated PUCCH resource) without configured spatial relation and PL-RS.

For the PDSCH transmission on the current active BWP of a serving cell without configured CORESET (e.g. SCell or CC #2), a plurality of TCI states may be activated. For the serving cell supporting multi-DCI based multi-TRP transmission, each activated TCI state can be associated with a CORESETPoolIndex, even if the serving cell (e.g. SCell or CC #2) is not configured with any CORESET. For example, when the SCell is not configured with any CORESET, each activated PDSCH TCI state for the SCell may be associated with a CORESETPoolIndex, which can take the same value as the CORESETPoolindex value configured for the PCell (e.g. CC #1). For example, a first set of activated PDSCH TCI states for the SCell may be associated with CORESETPoolindex=0, while a second set of activated PDSCH TCI states for the SCell may be associated with CORESETPoolindex=1.

In multiple-TRP scenario, the uplink resource (e.g. aperiodic SRS resource or PUCCH resource) triggered by a DCI can be associated with a CORESTPoolIndex value according to (which is the same as) the CORESETPoolIndex value configured for the CORESET transmitting the PDCCH carrying the triggering DCI.

Therefore, the default spatial relation and the default PL-RS for the transmission of the uplink resource on SCell (e.g. CC #2) can be determined from the activated TCI states for the PDSCH transmission on the current active BWP of the SCell (e.g. CC #2). The CORESETPoolindex value is considered when determining the default spatial relation and the default PL-RS. In particular, one of the activated TCI states for the PDSCH transmission on the current active BWP of the SCell (e.g. CC #2) that is associated with the same CORESETPoolindex value as that of the CORESETPoolIndex value associated with the uplink resource is determined as the default TCI state.

According to the second embodiment, the activated TCI state with the lowest ID applicable to PDSCH associated with the same CORESETPoolindex value as that of the CORESETPoolindex value associated with the triggered uplink resource is determined as the default TCI state. The default spatial relation and the default PL-RS for the uplink resource is determined according to the QCL-TypeD RS corresponding to the determined default TCI state.

In particular, a RS resource index $q_d$ providing a periodic RS resource with 'QCL-TypeD' in the determined default TCI state is determined as the pathloss reference RS, which is used to determine the transmit power for the uplink resource.

An example of the second embodiment is described as follows:

CC #1 and CC #2 are capable of multi-DCI based multi-TRP transmission. Multiple CORESETs are only configured for CC #1. That is, no CORESET is configured for CC #2.

Five CORESETs, e.g., CORESET #1, CORESET #2, CORESET #3, CORESET #4 and CORESET #5 are configured for CC #1 for the activate BWP. A higher layer parameter CORESETPoolIndex=0 is configured for CORE- SET #1, CORESET #2 and CORESET #3, and CORESET-PoolIndex=1 is configured for CORESET #4 and CORESET #5.

For CC #2 for which no CORESET is configured, {TCI-state #2, TCI-state #5, TCI-state #8, TCI-state #12, TCI-state #18. TCI-state #23, TCI-state #28, TCI-state #32} are activated for CORESETPoolIndex=0, and {TCI-state #42, TCI-state #45, TCI-state #48, TCI-state #52, TCI-state #58, TCI-state #63, TCI-state #68, TCI-state #72} are activated for CORESETPoolIndex=1.

If a UE receives a DCI containing non-zero SRS request field from a CORESET configured with CORESETPoolIndex=1 on CC #1 triggering transmission of an aperiodic SRS resource on CC #2, if the higher layer parameter spatialRelationInfo and pathlossReferenceRS are not configured for the triggered SRS resource but the higher layer parameter enableDefaultBeamPlForSRS is set as 'enable', the UE transmits the SRS resource according to the spatial relation with a reference to the RS with 'QCL-TypeD' corresponding to TCI state #42, i.e. the TCI state with lowest ID associated with CORESETPoolIndex=1 (the same as the CORESETPoolIndex value configured for the CORESET from which the triggering DCI is received).

The UE determines a RS resource index $q_d$ providing a periodic RS resource with 'QCL-TypeD' in TCI state #42 as the pathloss reference RS for SRS transmission.

The second embodiment is described with reference to the aperiodic SRS resource or the dedicated PUCCH resource triggered by a DCI. The second embodiment also applies to other uplink resources not triggered by a DCI (e.g. configured periodic SRS resource, semi-persistent (SP) SRS resource activated by a SP SRS Activation/Deactivation MAC CE, or PUCCH resource not triggered by a DCI). The uplink resources not triggered by a DCI and without configured spatialRelationInfo or PUCCH-spatialRelationInfo or pathlossReferenceRS but enableDefaultBeamPlForSRS or enableDefaultBeamPlForPUCCH is set as 'enable' can be associated with a CORESETPoolIndex value by RRC signaling. Therefore, the activated TCI state with the lowest ID applicable to PDSCH associated with the same CORESETPoolindex value as that of the CORESETPoolIndex value associated with the uplink resource not triggered by a DCI is determined as the default TCI state. The default spatial relation and the default PL-RS for the uplink resource not triggered by a DCI is determined according to the QCL-TypeD RS corresponding to the determined default TCI state.

In all of the above embodiments, the invention is described from the point of view of UE. That is, the UE determines the default spatial relation and the default PL-RS; and the triggered uplink resource is transmitted from the UE according to the default spatial relation and the default PL-RS. On the other hand, from the point of view of gNB (base station), the gNB determines the default spatial relation and the default PL-RS in the same manner as the UE; and the triggered uplink resource is received at the gNB according to the default spatial relation and the default PL-RS.

Figure 1:
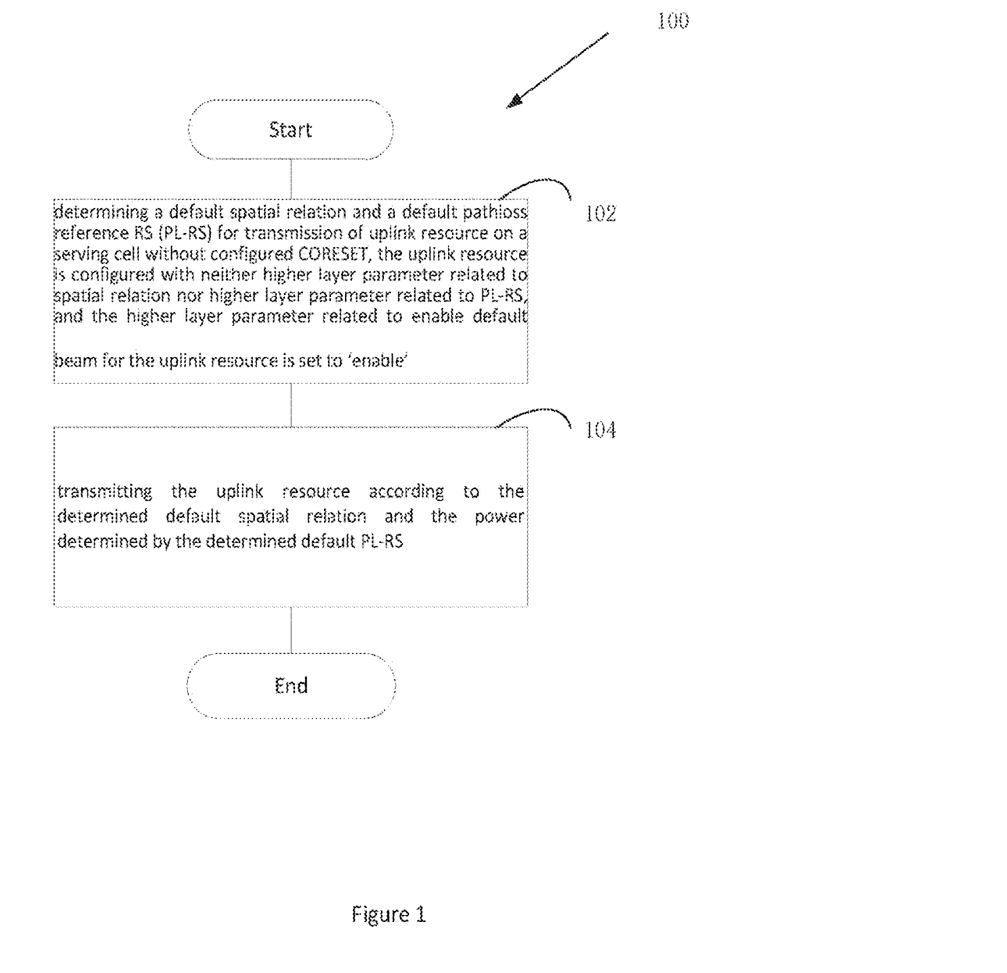
FIG. 1 is a schematic flow chart diagram illustrating an embodiment of a method.

FIG. 1 is a schematic flow chart diagram illustrating an embodiment of a method 100 according to the present application. In some embodiments, the method 100 is performed by an apparatus, such as a remote unit. In certain embodiments, the method 100 may be performed by a processor executing program code, for example, a microcontroller, a microprocessor, a CPU, a GPU, an auxiliary processing unit, a FPGA, or the like.

The method 100 may include 102 determining a default spatial relation and a default pathloss reference RS (PL-RS) for transmission of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and 104 transmitting the uplink resource according to the determined default spatial relation and the power determined by the determined default PL-RS.

Figure 2:
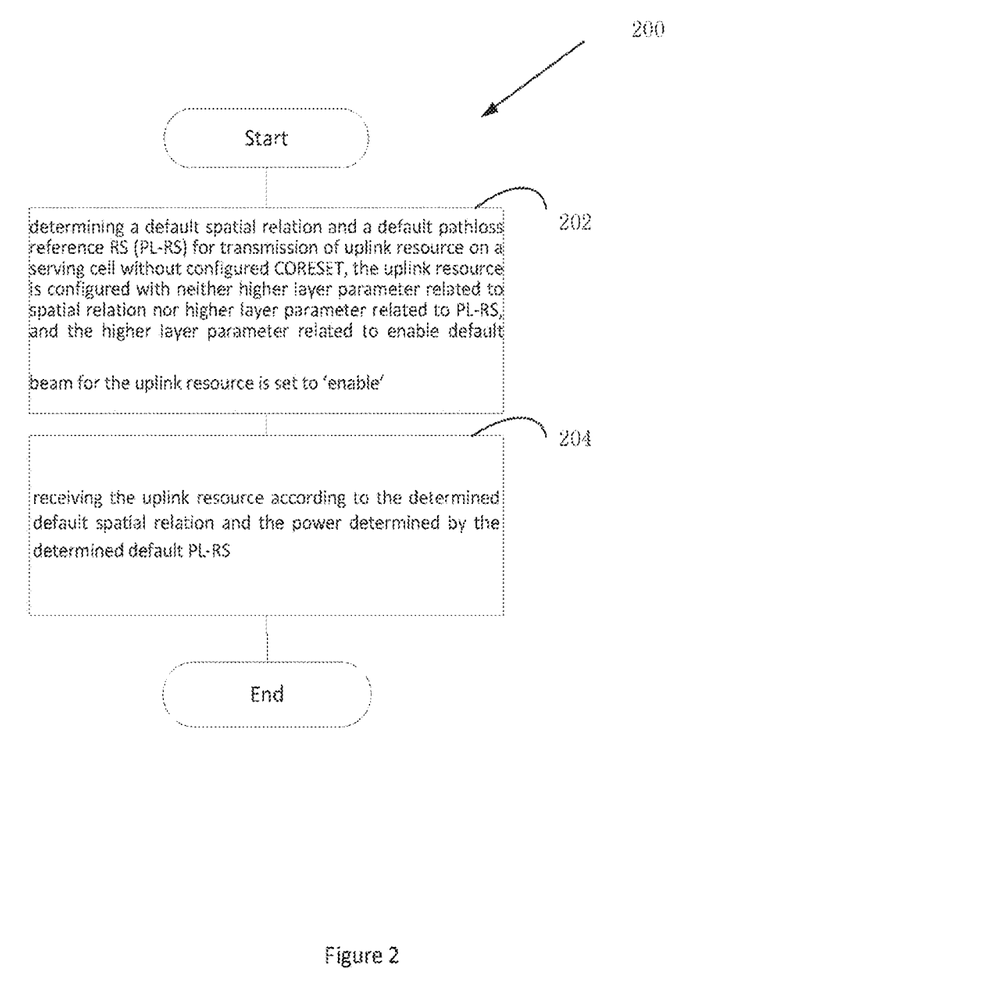
FIG. 2 is a schematic flow chart diagram illustrating a further embodiment of a method.

FIG. 2 is a schematic flow chart diagram illustrating an embodiment of a method 200 according to the present application. In some embodiments, the method 200 is performed by an apparatus, such as a base unit. In certain embodiments, the method 200 may be performed by a processor executing program code, for example, a microcontroller, a microprocessor, a CPU, a GPU, an auxiliary processing unit, a FPGA, or the like.

The method 200 may include 202 determining a default spatial relation and a default pathloss reference RS (PL-RS) for transmission of uplink resource on a serving cell without configured CORESET, the uplink resource is configured with neither higher layer parameter related to spatial relation nor higher layer parameter related to PL-RS, and the higher layer parameter related to enable default beam for the uplink resource is set to 'enable', and 204 receiving the uplink resource according to the determined default spatial relation and the power determined by the determined default PL-RS.

Figure 3:
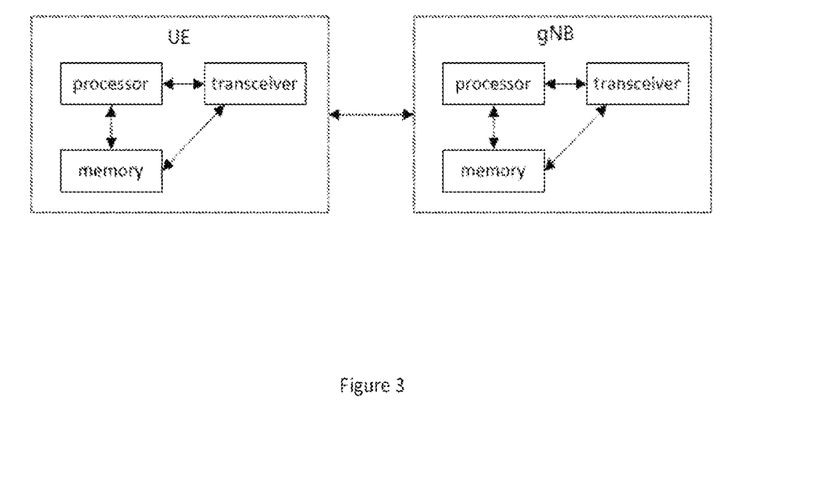
FIG. 3 is a schematic block diagram illustrating apparatuses according to one embodiment.

FIG. 3 is a schematic block diagram illustrating apparatuses according to one embodiment.

Referring to FIG. 3, the UE (i.e. the remote unit) includes a processor, a memory, and a transceiver. The processor implements a function, a process, and/or a method which are proposed in FIG. 1. The gNB (i.e. base unit) includes a processor, a memory, and a transceiver. The processors implement a function, a process, and/or a method which are proposed in FIG. 2. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a remote unit, the method comprising:
   determining a default spatial relation and a default pathloss reference signal (PL-RS) for transmission of uplink resource on a serving cell without configured control resource set (CORESET), wherein the uplink resource is configured with neither higher layer parameter related to spatial relation nor a higher layer parameter related to PL-RS, and a higher layer parameter related to enable default beam for the uplink resource is set to 'enable', and wherein the default spatial relation is determined based on a default transmission configuration indication (TCI) state; and
   transmitting the uplink resource according to the determined default spatial relation and a power determined based on the determined default PL-RS and the default TCI state.

2. The method of claim 1, wherein the uplink resource comprises a sounding reference signal (SRS) resource, the higher layer parameter related to spatial relation comprises spatialRelationInfo, the higher layer parameter related to PL-RS comprises pathlossReferenceRS, and the higher layer parameter related to enable default beam comprises enableDefaultBeamPlForSRS.

3. The method of claim 1, wherein the uplink resource comprises dedicated physical uplink control channel (PUCCH) transmission, the higher layer parameter related to spatial relation comprises PUCCH-spatialRelationInfo, the higher layer parameter related to PL-RS comprises pathlossReferenceRS, and the higher layer parameter related to enable default beam comprises enableDefaultBeamPlForPUCCH.

4. The method of claim 1, wherein, if at least one transmission configuration indication (TCI) field codepoint for physical downlink shared channel (PDSCH) transmission on the serving cell points to two different TCI states, the default spatial relation is determined with reference to the RS with quasi co-location (QCL)-Type D corresponding to a default TCI state which is determined as a first TCI state pointed to by a lowest TCI codepoint among TCI field codepoints containing two different TCI states.

5. The method of claim 1, wherein, if at least one transmission configuration indication (TCI) field codepoint for physical downlink shared channel (PDSCH) transmission on the serving cell points to two different TCI states, the default spatial relation is determined with reference to the RS with quasi co-location (QCL)-Type D corresponding to a default TCI state which is determined as a first TCI state pointed to by a lowest TCI codepoint among multiple TCI field codepoints.

6. The method of claim 1, wherein, the serving cell is a SCell without configured CORESET, each activated transmission configuration indication (TCI) state for physical downlink shared channel (PDSCH) on the SCell is associated with a CORESETPoolIndex value configured on a primary cell (PCell), the spatial relation is determined with reference to the RS with quasi co-location (QCL)-Type D corresponding to a default TCI state which is determined as the activated TCI state with a lowest identifier (ID) applicable to PDSCH associated with a same CORESETPoolIndex value as a CORESETPoolIndex value associated with the uplink resource in an active downlink bandwidth part (DL-BWP).

7. A remote unit for wireless communication, comprising:
   at least one memory; and
   at least one processor coupled with the at least one memory and configured to cause the remote unit to:
      determining a default spatial relation and a default pathloss reference signal (PL-RS) for transmission of uplink resource on a serving cell without configured control resource set (CORESET), wherein the uplink resource is configured with neither higher layer parameter related to spatial relation nor higher layer parameter related to PL-RS, and a higher layer parameter related to enable default beam for the uplink resource is set 'enable', and wherein the default spatial relation is determined based on a default transmission configuration indication (TCI) state; and
      transmitting the uplink resource according to the determined default spatial relation and a power determined based on the determined default PL-RS and the default TCI state.

8. The remote unit of claim 7, wherein the uplink resource comprises a sounding reference signal (SRS) resource, the higher layer parameter related to spatial relation comprises spatialRelationInfo, the higher layer parameter related to PL-RS comprises pathlossReferenceRS, and the higher layer parameter related to enable default beam comprises enableDefaultBeamPlForSRS.

9. The remote unit of claim 7, wherein the uplink resource comprises dedicated physical uplink control channel (PUCCH) transmission, the higher layer parameter related to spatial relation comprises PUCCH-spatialRelationInfo, the higher layer parameter related to PL-RS comprises pathlossReferenceRS, and the higher layer parameter related to enable default beam comprises enableDefaultBeamPlForPUCCH.

10. The remote unit of claim 7, wherein, if at least one TCI field codepoint for physical downlink shared channel (PDSCH) transmission on the serving cell points to two different TCI states, the processor is configured to determine the default spatial relation with reference to the RS with quasi co-location (QCL)-Type D corresponding to a default TCI state which is determined as a first TCI state pointed to by a lowest TCI codepoint among TCI field codepoints containing two different TCI states.

11. The remote unit of claim 7, wherein, if at least one TCI field codepoint for physical downlink shared channel (PDSCH) transmission on the serving cell points to two different TCI states, the processor is configured to determine the default spatial relation with reference to the RS with quasi co-location (QCL)-Type D corresponding to a default TCI state which is determined as a first TCI state pointed to by a lowest TCI codepoint among multiple TCI field codepoints.

12. The remote unit of claim 7, wherein, the serving cell is a SCell without configured CORESET, each activated TCI state for physical downlink shared channel (PDSCH) on the SCell is associated with a CORESETPoolIndex value configured on a primary cell (PCell), the spatial relation is determined with reference to the RS with quasi co-location (QCL)-Type D corresponding to a default TCI state which is determined as the activated TCI state with a lowest identifier (ID) applicable to PDSCH associated with a same CORESETPoolIndex value as a CORESETPoolIndex value associated with the uplink resource in an active downlink bandwidth part (DL-BWP).

13. The remote unit of claim 7, wherein, the at least one processor is configured to cause the base unit to determine the default PL-RS by determining a RS resource index $q_d$ providing a periodic RS resource with quasi co-location (QCL)-Type D in a determined default TCI state.

14. A base unit for wireless communication, comprising:
at least one memory; and
at least one processor coupled with the at least one memory and configured to cause the base unit to:
determining a default spatial relation and a default pathloss reference signal (PL-RS) for reception of uplink resource on a serving cell without configured control resource set (CORESET), wherein the uplink resource is configured with neither a higher layer parameter related to spatial relation nor higher layer parameter related to PL-RS, and a higher layer parameter related to enable default beam for the uplink resource is set to 'enable', and wherein the default spatial relation is determined based on a default transmission configuration indication (TCI) state; and
receiving the uplink resource according to the determined default spatial relation and a power determined based on the determined default PL-RS at the default TCI state.

15. The base unit of claim 14, wherein the uplink resource comprises a sounding reference signal (SRS) resource, the higher layer parameter related to spatial relation comprises spatialRelationInfo, the higher layer parameter related to PL-RS comprises pathlossReferenceRS, and the higher layer parameter related to enable default beam comprises enableDefaultBeamPlForSRS.

16. The base unit of claim 14, wherein the uplink resource comprises dedicated physical uplink control channel (PUCCH) transmission, the higher layer parameter related to spatial relation comprises PUCCH-spatialRelationInfo, the higher layer parameter related to PL-RS comprises pathlossReferenceRS, and the higher layer parameter related to enable default beam comprises enableDefaultBeamPlForPUCCH.

17. The base unit of claim 14, wherein, if at least one TCI field codepoint for physical downlink shared channel (PDSCH) transmission on the serving cell points to two different TCI states, the processor is configured to determine the default spatial relation with reference to the RS with quasi co-location (QCL)-Type D corresponding to a default TCI state which is determined as a first TCI state pointed to by a lowest TCI codepoint among TCI field codepoints containing two different TCI states.

18. The base unit of claim 14, wherein, if at least one TCI field codepoint for physical downlink shared channel (PDSCH) transmission on the serving cell points to two different TCI states, the processor is configured to determine the default spatial relation with reference to the RS with quasi co-location (QCL)-Type D corresponding to a default TCI state which is determined as a first TCI state pointed to by a lowest TCI codepoint among multiple TCI field codepoints.

19. The base unit of claim 14, wherein, the serving cell is a SCell without configured CORESET, each activated TCI state for physical downlink shared channel (PDSCH) on the SCell is associated with a CORESETPoolIndex value configured on a primary cell (PCell), the spatial relation is determined with reference to the RS with quasi co-location (QCL)-Type D corresponding to a default TCI state which is determined as the activated TCI state with a lowest identifier (ID) applicable to PDSCH associated with a same CORESETPoolIndex value as a CORESETPoolIndex value associated with the uplink resource in an active downlink bandwidth part (DL-BWP).

20. A method performed by a base unit, the method comprising:
determining a default spatial relation and a default pathloss reference signal (PL-RS) for reception of uplink resource on a serving cell without configured control resource set (CORESET), wherein the uplink resource is configured with neither a higher layer parameter related to spatial relation nor higher layer parameter related to PL-RS, and a higher layer parameter related to enable default beam for the uplink resource is set to 'enable', and wherein the default spatial relation is determined based on a default transmission configuration indication (TCI) state; and
receiving the uplink resource according to the determined default spatial relation and a power determined based on the determined default PL-RS at the default TCI state.

* * * * *